(12) United States Patent
Lallouet

(10) Patent No.: US 8,633,381 B2
(45) Date of Patent: Jan. 21, 2014

(54) TERMINATION UNIT FOR MULTI-PHASE SUPERCONDUCTOR CABLE

(75) Inventor: Nicolas Lallouet, Fiennes (FR)

(73) Assignee: Nexans, Paris (FR)

( * ) Notice: Subject to any disclaimer, the term of this patent is extended or adjusted under 35 U.S.C. 154(b) by 71 days.

(21) Appl. No.: 13/459,354

(22) Filed: Apr. 30, 2012

(65) Prior Publication Data

US 2012/0289072 A1 Nov. 15, 2012

(30) Foreign Application Priority Data

May 20, 2011 (FR) ..................................... 11 54077

(51) Int. Cl.
*H01B 7/42* (2006.01)

(52) U.S. Cl.
USPC ........ 174/15.5; 174/125.1; 505/230; 439/196

(58) Field of Classification Search
USPC ............. 174/15.3–15.6, 125.1; 505/230, 505; 439/196
See application file for complete search history.

(56) References Cited

U.S. PATENT DOCUMENTS

| 3,902,000 | A | * | 8/1975 | Forsyth et al. | ................ | 174/15.3 |
| 6,049,036 | A | * | 4/2000 | Metra | ........................... | 174/15.5 |
| 6,936,771 | B2 | * | 8/2005 | Sinha et al. | ................. | 174/125.1 |
| 2006/0011377 | A1 | | 1/2006 | Schmidt et al. | | |
| 2007/0137881 | A1 | | 6/2007 | Ashibe | | |
| 2010/0126748 | A1 | * | 5/2010 | Traeholt et al. | .............. | 174/15.5 |

OTHER PUBLICATIONS

International Search Report dated Jan. 5, 2012.
"High-temperature superconducting tri-axial power cable".

* cited by examiner

*Primary Examiner* — Gary F. Paumen
(74) *Attorney, Agent, or Firm* — Sofer & Haroun, LLP

(57) ABSTRACT

A termination unit for a multi-phase superconductor cable has, for each phase, a cylindrical modular element (1, 2, 3) having a thermally insulating external envelope (1A, 2A, 3A) containing a superconductor cable portion (7, 8, 9) contained in an internal envelope (1B, 2B, 3B) containing a cooling fluid. A branch element (4, 5, 6) of each phase, provided with an electrical connection element (4A, 5A, 6A), is arranged at the end of each said modular element, where each branch element (4, 5, 6) is directly connected to the corresponding cable portion (7, 8, 9) and only the electrical connection element (4A, 5A, 6A) projecting from the modular elements (1, 2, 3).

10 Claims, 5 Drawing Sheets

TERMINATION UNIT FOR MULTI-PHASE SUPERCONDUCTOR CABLE

RELATED APPLICATION

This application claims the benefit of priority from French Patent Application No. 11 54077, filed on May 11, 2011, the entirety of which is incorporated. by reference.

BACKGROUND

1. Field of the Invention

The invention relates to a termination unit for a multi-phase superconductor cable, for medium. or high voltage.

2. Description of the Related Art

A multi-phase, generally three-phase, superconductor cable may comprise, around a longitudinal axis and inside a thermal envelope containing a cooling fluid, a supporting central core that may be tubular and also contain a cooling fluid, and on which. superconducting layers from phase no. 1 to phase no. N are concentrically arranged and, lastly, a screen layer of a neutral conductor. Between each superconducting layer is a dielectric layer.

Patent document WO 2008/113366 describes a. termination unit for a superconductor cable of this type.

This termination comprises, for each phase, a modular element. comprising a. thermally insulating external envelope containing a. superconductor cable portion contained in an internal envelope containing cooling fluid and provided with a perpendicular insulator portion containing a branch element of the corresponding phase of the cable ending in an electrical connection element and designed to manage the electrical field.

Objects and Summary

The object of the invention is to propose a termination unit, for a multi-phase superconductor cable, that is, in particular, of simpler, more compact structure.

To that end, the invention proposes a termination unit for a multi-phase superconductor cable comprising, for each phase, a cylindrical modular element comprising an external thermal insulation envelope containing a. superconductor cable portion contained in an internal envelope containing a cooling fluid, characterized in that a branch element of each phase provided. with an electrical connection element is arranged at the end of each said modular element, each. said branch. element being directly connected to said corresponding cable portion and only said electrical connection element projecting from said modular elements.

According to a preferred embodiment, said branch element is constituted by an electrical conductor plate carried mechanically by said adjacent envelopes and comprising an internal ring connected electrically to the corresponding phase of said cable and carried by said adjacent internal envelopes.

Advantageously, said internal ring is provided with a. passage opening for said cooling fluid.

Preferably, said. internal ring is provided, at its periphery, with deformable electrical conductor elements connecting it electrically to an external ring carrying said electrical connection element.

Said deformable electrical conductor elements may be multi-contact. blades.

In addition, said external ring may comprise through-slits designed to form thermal conduction chicanes.

Said deformable electrical conductor elements may be radial blades for mechanical connection of said internal ring and said external ring.

Said deformable electrical conductor elements may also be braided, e.g. copper-braided, conductors, connecting said internal ring and said external ring.

Advantageously, said internal ring is constituted by two concentric rings connected by multi-contact blades.

Said internal envelope is preferably made from a. thermally insulating material and, advantageously, a thermally insulating foam is arranged between said internal and external envelopes.

BRIEF DESCRIPTION OF THE DRAWINGS:

The invention is described. below in greater detail with the aid of figures that represent only preferred embodiments of the invention.

DETAILED DESCRIPTION

Figure 1:
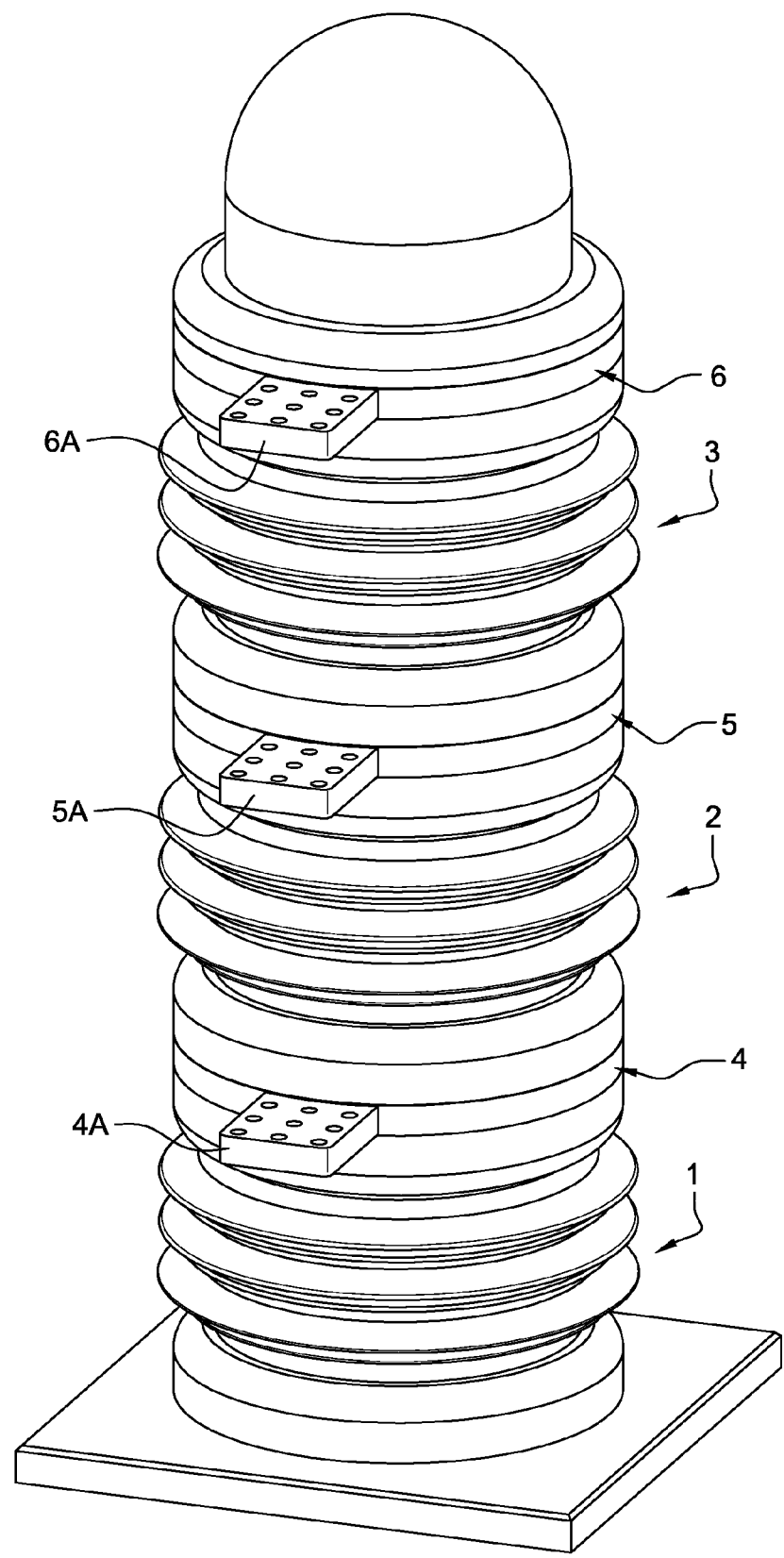
FIG. 1 is a perspective view of a termination unit according to the invention.

As shown in FIG. 1, a termination unit for a multi-phase superconductor cable comprises, for each phase, a cylindrical modular element 1, 2, 3 comprising a thermally insulating external envelope made from a dielectric material, e.g. from fiber-reinforced epoxy with silicone flakes, and provided with a metallic, e.g. aluminum, end flange, this envelope containing a superconductor cable portion contained in an internal envelope constituted by a dielectric material containing a cooling fluid.

A branch element 4, 5, 6 of each phase, provided with an electrical, connection element 4A, 5A, 6A, of lug type, is arranged at the end of each modular element 1, 2, 3, only this electrical connection element 4A, 5A, 6A projecting from the modular elements 1, 2, 3.

Modular elements and branch elements may be superposed, as illustrated in. FIG. 1, and the termination may be vertical, or modular elements and branch elements may be juxtaposed one alongside another and the termination. may be horizontal.

Figure 2:
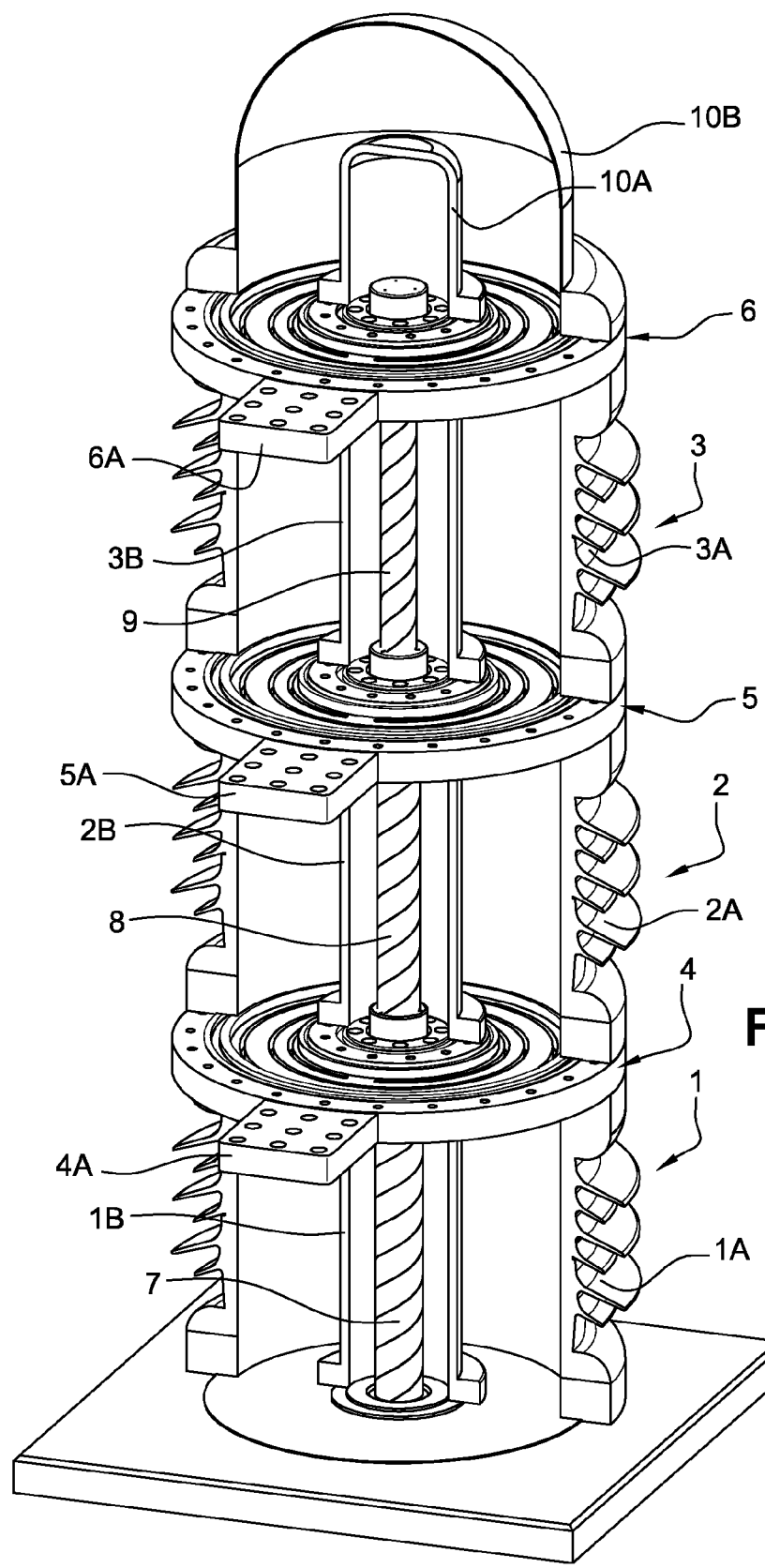
FIG. 2 is a perspective view, in longitudinal section, of a termination unit according to the invention.

As may be seen in FIG. 2, each cylindrical modular element 1, 2, 3 thus comprises a thermally insulating external, envelope 1A, 2A, 3A containing a. superconductor cable portion 7, 8, 9 contained in an internal envelope 1B, 2B, 3B containing a cooling fluid, e.g. liquid. nitrogen.

The internal envelopes 1B, 2B, 3B are made from dielectric material and preferably from thermally insulating material, preferably from polymer, e.g. from continuous glass-fabric laminate in an epoxy resin, known by the name "G10", and a thermally insulating foam may be arranged between the internal 1B, 2B, 3B and external 1A, 2A, 3A envelopes, for example expanded polyisocyanurate or glass foam.

The upper branch element 6 corresponding to the third phase is surmounted by an internal cap 10A containing the cooling fluid. and by an external cap 10B, which may be metallic, e.g. made from aluminum.

Each branch element 4, 5, 6 is directly connected electrically to the corresponding cable portion 7, 8, 9.

Figure 3:
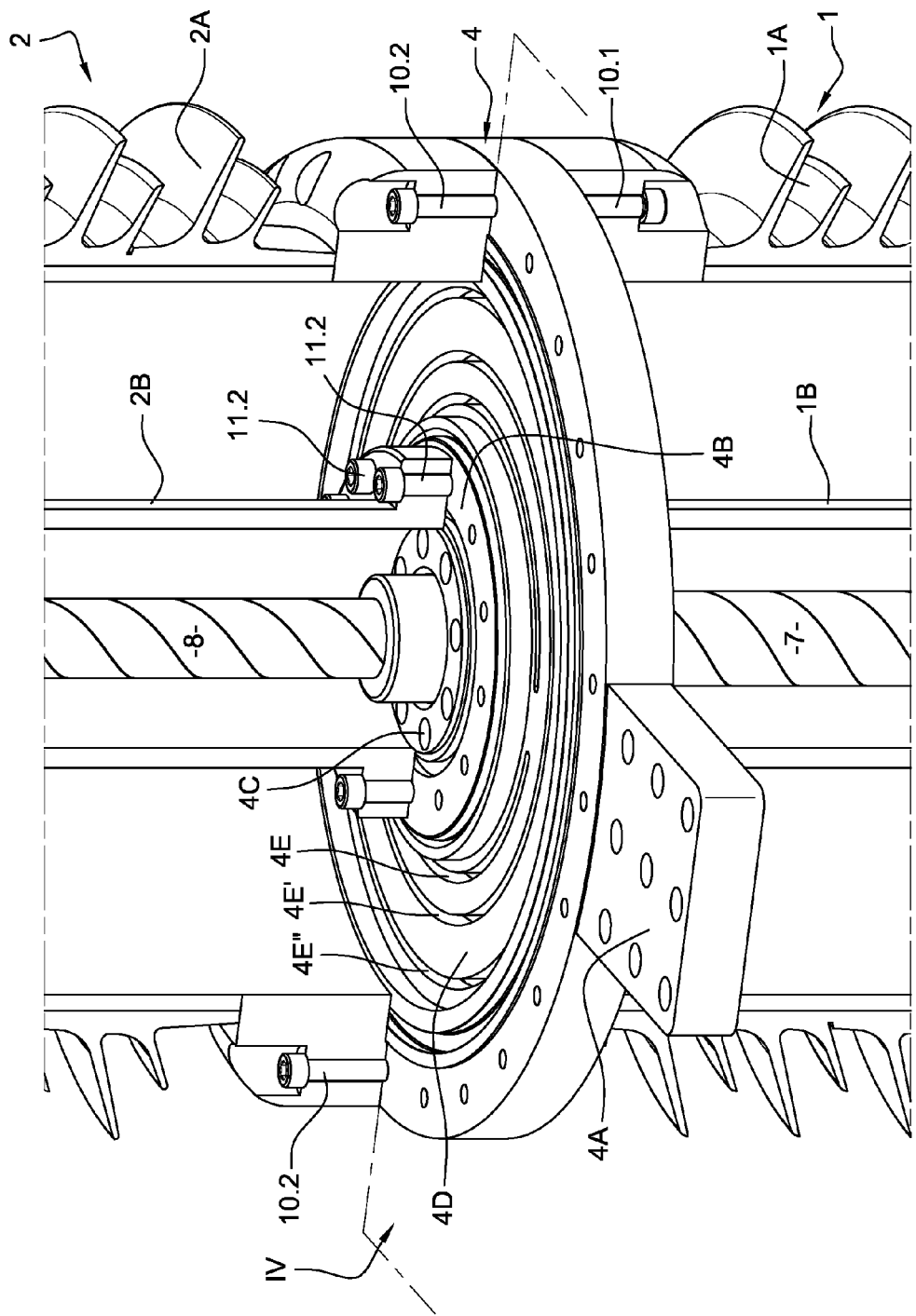
FIG. 3 is a detailed. view in perspective and in longitudinal section of a termination unit according to the invention.
Figure 4:
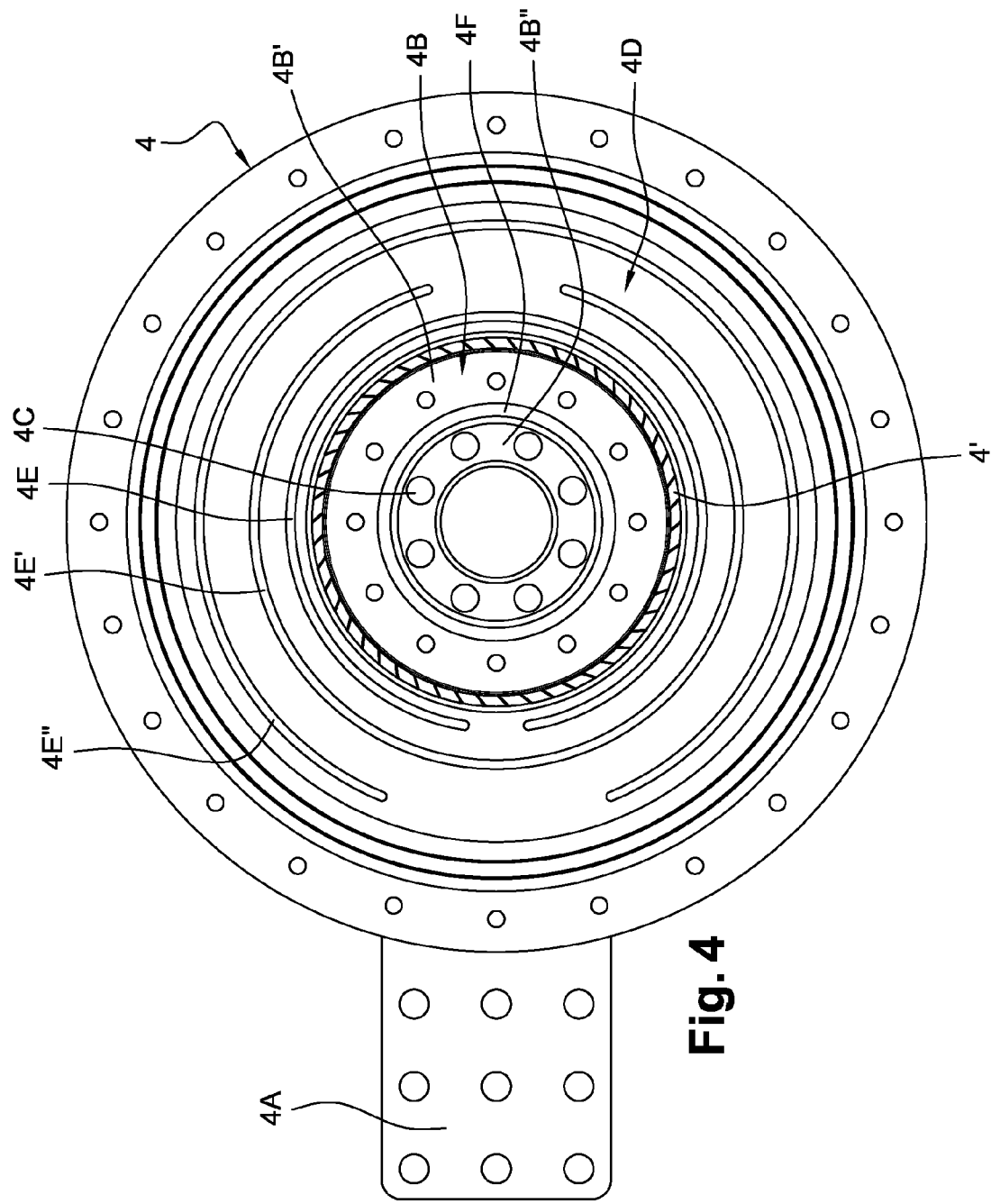
FIG. 4 is a view, in transverse section, of a termination unit according to the invention, along the plane IV-IV.

According to the embodiment illustrated in FIGS. 2, 3 and 4, and as may be seen particularly in FIGS. 3 and 4, each branch element, e.g. 4, is constituted by an electrical, conductor plate, e.g. made from copper or from aluminum, carried mechanically by the adjacent external envelopes 1A, 2A of the adjacent modular elements, by means of screws 10.1, 10.2 traversing a corresponding flange of the envelopes and also the plate and by the adjacent internal envelopes 1B, 2B of the adjacent modular elements by means of screws 11.1, 11.2 traversing a corresponding flange of the envelopes and also the plate.

Each branch element, e.g. 4, comprises a central internal ring 4B connected electrically directly to the corresponding phase of the cable, e.g. by means of multi-contacts, and carried by the adjacent internal envelopes 1B, 2B of the adjacent modular elements. Each internal ring 4B is provided with passage openings 4C for the cooling fluid.

This internal ring 4B is provided, at its periphery, with deformable electrical conductor elements, which are multi-contact blades 4' according to this embodiment, connecting it electrically to a peripheral external ring 4D carrying the electrical connection element 4A. These deformable elements make it possible to ensure electrical conduction while absorbing contraction deformations generated by the temperature of the cooling fluid.

This external ring 4D comprises through-slits 4E, 4E' and 4E" designed to form thermal conduction chicanes with a view to minimizing thermal conduction between the exterior and the interior.

For mechanical mounting reasons, the internal ring 4B is preferably itself constituted by two concentric rings 4B and 4B" connected by multi-contact blades 4F.

Figure 5:
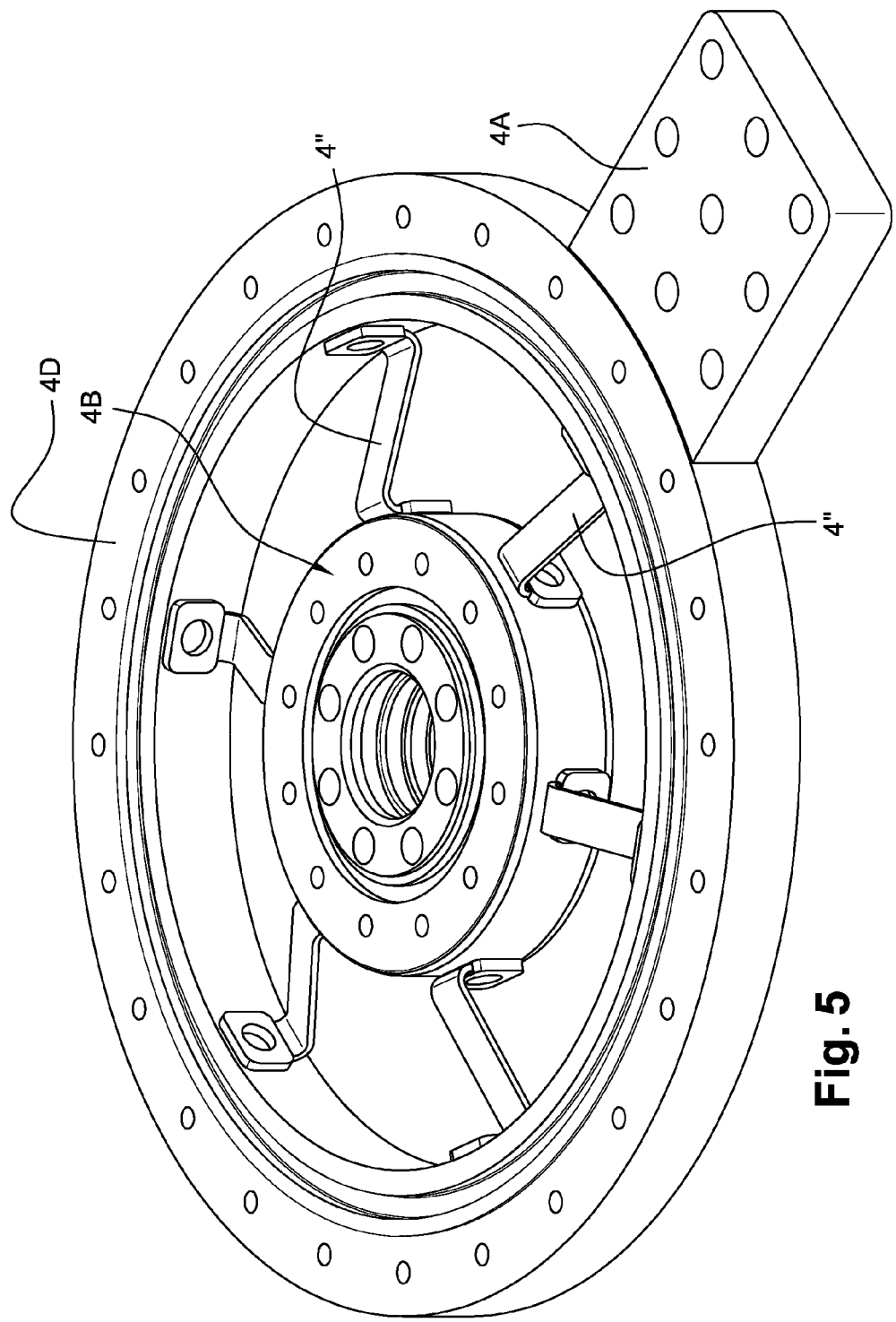
FIG. 5 is a detailed view in perspective according to a further embodiment of the invention.

FIG. 5 shows a further embodiment in which the deformable electrical conductor elements between. the internal ring 4B and the external ring 4D are different.

These deformable electrical conductor elements are radial flexible elements 4" connecting said internal ring and said external ring.

According to the example shown, these flexible elements are radial blades connecting the internal ring 4B and the external ring 4D, preferably screwed onto the rings 4B and 4D. These blades are metallic, e.g. made from aluminum, copper or brass, and may be replaced by conducting braided conductors.

By virtue of the fact that they are thin and inherently flexible, these blades 4" ensure electrical conduction while absorbing contraction deformations generated by the temperature of the cooling fluid.

They also guarantee that thermal conduction between the exterior and the interior will be minimal by virtue of the spaces separating them and thus, in this case, the external ring 4D is constituted by a simple ring.

Although not shown in the figures, the interface flanges between the modular elements and the branch elements, provided with screws 10.1, 10.2, 11.1 and 11.2, are provided with seals.

The invention claimed is:

1. Termination unit for a multi-phase superconductor cable comprising:
   for each phase, a cylindrical modular element having an external thermal insulation envelope containing a superconductor cable portion contained in an internal envelope containing a cooling fluid,
   wherein a branch element of each phase provided with an electrical connection element is arranged at the end of each said modular element, each said branch element being directly connected to said corresponding cable portion and only said electrical connection element projecting from said modular elements.

2. The termination unit according to claim 1, wherein said branch element is constituted by an electrical conductor plate carried mechanically by said adjacent envelopes and having an internal ring connected electrically to the corresponding phase of said cable and carried by said adjacent internal envelopes.

3. The termination unit according to claim 2, wherein said internal ring is provided with a passage opening for said cooling fluid.

4. The termination unit according to claim 2, wherein said internal ring is provided, at its periphery, with deformable electrical conductor elements connecting said internal ring electrically to an external ring carrying said electrical connection element.

5. The termination unit according to claim 4, wherein said deformable electrical conductor elements are multi-contact blades.

6. The termination unit according to claim 5, wherein said external ring includes through-slits designed to form thermal conduction chicanes.

7. The termination unit according to claim 4, wherein said deformable electrical conductor elements are radial flexible elements connecting said internal ring and said external ring.

8. The termination unit according to claim 1, wherein said internal ring is formed of two concentric rings connected by multi-contact blades.

9. The termination unit according to claim 1, wherein said internal envelope is made from a thermally insulating material.

10. The termination unit according to claim. 1, wherein a thermally insulating foam is arranged between said internal and external envelopes.

* * * * *